Figure 5:
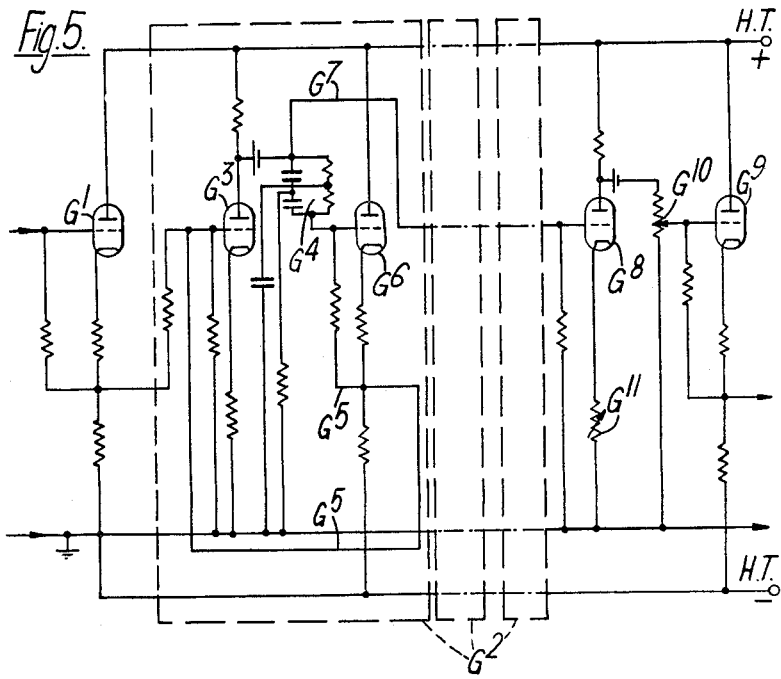

June 9, 1964    R. E. REASON    3,136,069
TESTING THE PROFILES OF SURFACE SECTIONS
Filed Nov. 13, 1961    4 Sheets-Sheet 1
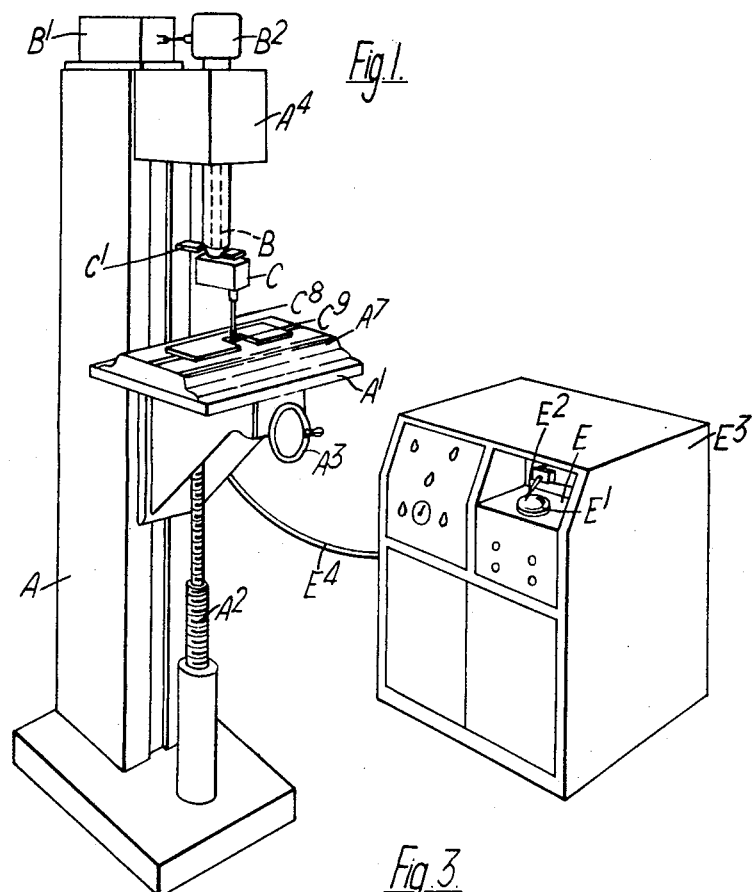
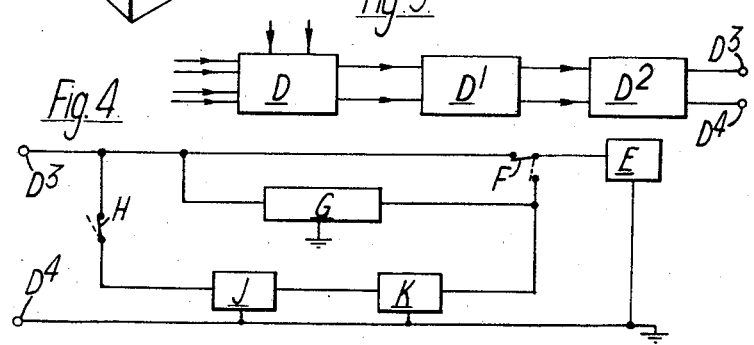
Inventor
R.E. Reason
By
Holcomb, Wetherill & Brisbois
Attorneys

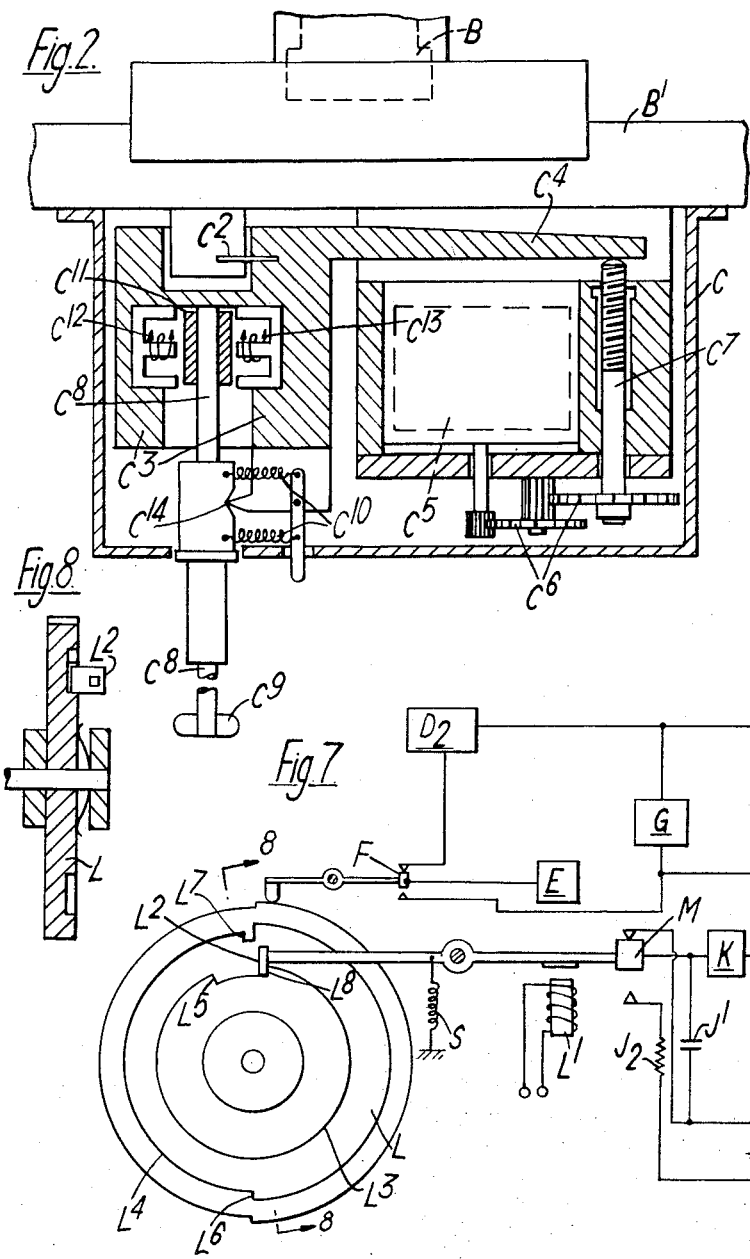

Inventor
R. E. Reason

United States Patent Office 3,136,069
Patented June 9, 1964

3,136,069
TESTING THE PROFILES OF SURFACE SECTIONS
Richard Edmund Reason, Leicester, England, assignor to Rank Precision Industries Limited, trading as The Rank Organisation Rank Taylor Hobson Division, Leicester, England, a British company
Filed Nov. 13, 1961, Ser. No. 151,988
Claims priority, application Great Britain Nov. 16, 1960
22 Claims. (Cl. 33—174)

This invention relates to the testing of the profile of a surface section, and more particularly to apparatus for indicating and measuring the deviations of a surface section with respect to a basic closed curve, for example a circle or an ellipse.

In the testing of an at least approximately round surface section of a workpiece it is known to detect the variations in the radius of the surface section by relatively rotating the workpiece and a detector device about an accurately defined axis, and to apply the output of the detector device either to recording means having a chart of the polar coordinate type providing an indication record in the form of a profile curve representing the shape of the section under test, or to a meter integrating the variations in radius about a mean.

When in testing a surface section the output of the detector device is applied to recording means, various proposals have been made for determining a reference on the chart relative to which the deviations of the surface section can be measured. For example it has been proposed to use as a reference either the smallest circumscribing circle or the largest inscribing circle of the profile curve representing the shape of the section under test, or again the narrowest concentric zone just enclosing such profile curve.

The determination of a reference in the above-described manner usually sets problems of personal judgment in the presence of chance irregularities in the shape of the surface section under test, and thus the measurement based on such a reference is dependent on the skill with which such problems of personal judgment are resolved. A convenient reference with respect to which measurments should be effected is the mean line of the profile curve, defined as a circle having a radius value about which the sum of the radial variations of the profile curve is a minimum. The centre of such mean circle may be defined as the true centre of the profile curve corresponding to the true centre of the surface section under test. In the case when any of the other references previously mentioned are chosen, and the centre of such reference is regarded as the centre of the profile curve (corresponding to the centre of the surface section under test) for measurement purposes, the position of such reference centre, like that of the reference itself, will often depend on human judgment, and will also often be indeterminate since it may be possible to find more than one such position complying with any proposed definition.

One object of the present invention is to provide apparatus for indicating and measuring the deviations of a surface section with respect to a basic closed curve whereby the above-mentioned difficulties involved in determining a reference are substantially overcome by using the mean line of the profile curve as a reference.

The apparatus according to the present invention comprises detecting means cooperating with the surface under test, means for relatively rotating the detecting means and the surface under test, means controlled by the detecting means for generating a combined D.C. and A.C. electrical signal output representing the shape of the surface section under test and the position thereof relative to the axis of relative rotation, an extracting device for deriving from the signal output an A.C. signal extract excluding the Fourier D.C. component of such signal output and the Fourier A.C. components of such signal output above a chosen harmonic, such A.C. component or components included in such A.C. signal extract having the same amplitude as the corresponding component or components in the signal output, integrating means responsive to the signal output over one or more complete relative rotations of the detecting means and the surface under test, and for delivering a steady D.C. signal equal in magnitude to the mean D.C. level of the signal output, visual indicating means, and means for applying to the indicating means the signal output and in correct phase relationship thereto a reference signal constituted by the A.C. signal extract and the steady D.C. signal in combination, whereby there is formed in superimposition at the indicating means a curve representing the actual shape of the surface section under test and a reference curve from which the deviations of the surface section under test can be measured.

By way of explanation it should be made clear that, provided the axis of relative rotation of the detecting means and the surface under test is not too far removed from the true centre of central axis of such surface under test, the shape or profile of the surface section under test relative to such axis of relative rotation can be expressed as a Fourier series consisting of a constant term together with a progression of sinusoidal terms. Likewise, the signal output generated under the control of the detecting means can be expressed as a Fourier series having a progression of A.C. components together with a D.C. component representing the mean D.C. level of the sinusoidal A.C. components. The mean D.C. level of the signal output may conveniently be determined in accordance with a datum provided by the detecting means.

The first or fundamental A.C. component of the signal output occurs at the frequency of relative rotation of the detecting means and the surface under test, and thus represents the eccentricity of the surface section under test relative to the aixs of relative rotation. This first A.C. component therefore does not represent any deviations from roundness of the surface section but represents the distance between the true centre of such surface section and the axis of relative rotation. The second A.C. component of the signal output occurs at twice the frequency of relative rotation and thus represents the ovality of the surface section under test.

It will thus be appreciated that, in the measurement of roundness for example, the deviations of the surface section under test may be measured by comparing a graph of the whole signal output generated under the control of the detecting means with a graph which is a plot of the sum of the Fourier D.C. component of the signal output (i.e., the steady D.C. signal delivered from the output means), and the first Fourier A.C. component of the signal output (derived from such signal output by the extracting device).

Provided, as mentioned above, the profile of the surface section under test can be represented as Fourier series of terms, the measurement of such profile shape can be effected analytically, for example by measuring ovality, represented by the second harmonic of the progression of sinusoidal terms, relative to the first harmonic of such progression, or by comparing higher harmonics with the second. In the latter case, the desired reference curve relative to which the deviations should be measured is constituted by the graph which is a plot of the sum of the first two Fourier A.C. components of the signal output derived from such output by the extracting device together with the Fourier D.C. component of the signal output constituted by the steady D.C. signal from the integrator output means, since, as the second Fourier A.C. component at twice the frequency of relative rotation of the surface under test and the detecting device constitutes a term representing ovality, this graph represents the true mean ellipse of the profile or surface section under test.

Thus in general, in the measurement of the deviations of a surface section with respect to a basic closed curve, the reference curve representing such basic closed curve and relative to which the deviations should be measured, is constituted by the graph which is a plot of the sum of a number of the Fourier A.C. components of the signal output together also with the Fourier D.C. component constituted by the mean D.C. component present in such signal output.

It is another object of the invention to provide in the apparatus one or more extracting devices enabling the surface section profile to be measured with respect to a reference circle formed at the visual indicating means. A further object is to provide one or more extracting devices enabling such section profile to be measured with respect to a reference ellipse formed at the visual indicating means. In connection with the measurement of ovality, it should be mentioned that such ovality can be determined by measuring the major and minor axes of the reference ellipse formed at the indicating means, and that it is not in addition necessary for the true mean circle of the profile to be formed.

A still further object of the invention is to provide in the apparatus means for automatically feeding the desired signals to the visual indicating means during successive revolutions of the detecting means and the surface under test.

A still further object concerns the provision in the apparatus of meters for indicating certain deviations between the actual surface section profile and the reference curve.

Figure 6:
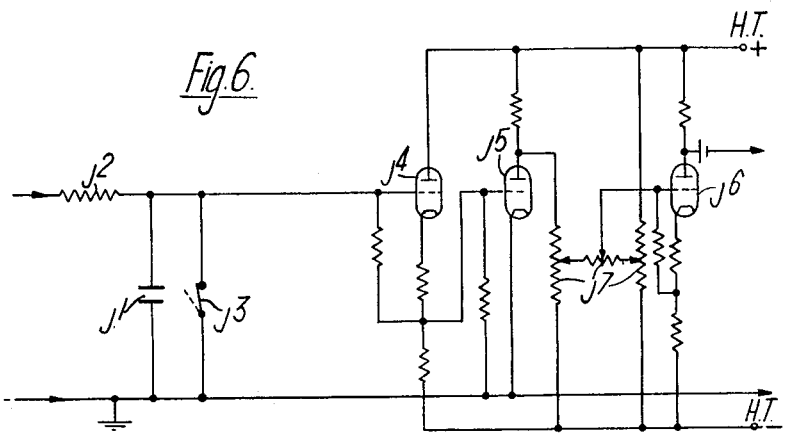
Figure 9:
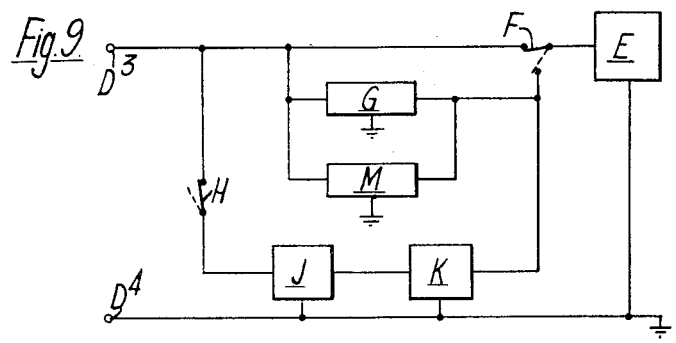
Figure 10:
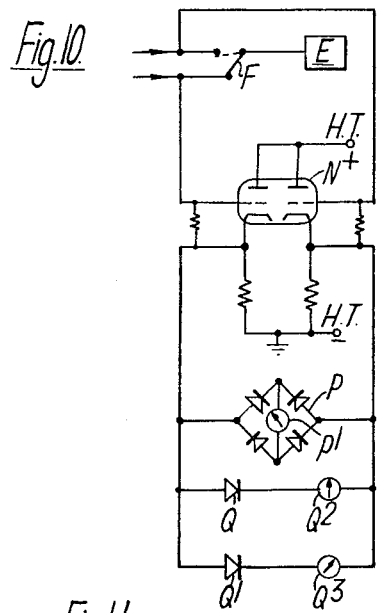
Figure 11:
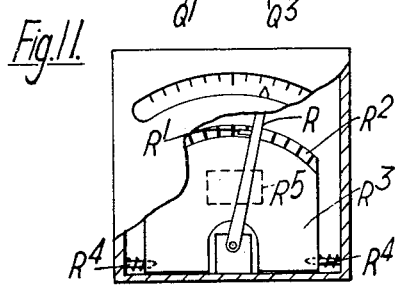

Further objects and advantages of the invention will be apparent from the preferred arrangement of apparatus now to be described with reference to the accompanying drawings in which, FIGURE 1 shows the complete apparatus, FIGURE 2 is a detailed view of the detecting means, FIGURE 3 diagrammatically illustrates the electrical means to which the detector output is applied to produce a desired signal output, FIGURE 4 diagrammatically illustrates the electrical means for producing a reference signal from the signal output, FIGURES 5 and 6 are detailed circuit diagrams of the main parts of the electrical means of FIGURE 4, FIGURE 7 and FIGURE 8, in section on the line 8—8 of FIGURE 7, show a cam device for controlling switches used in the electrical means of FIGURE 4, FIGURE 9 shows a modification to the electrical means of FIGURE 4, FIGURE 10 shows various indicating means to which the signal output and reference signal are applied, and FIGURE 11 shows one particular indicator for use in the indicating means of FIGURE 10.

Conveniently, that part of the profile testing apparatus for producing a signal output from a detecting device co-operating with the surface under test when rotated relatively thereto may be arranged for example in the manner described in United States Patent specification No. 2,723,461. Briefly, such part of the apparatus comprises a pedestal A, a work-table $A^1$ mounted on a stem $A^2$ for adjustment in the vertical direction by means of a hand control $A^3$, a test spindle B carrying a displacement detector C, and an overhead bracket $A^4$ from the pedestal A carrying the test spindle B, such arrangement having the general form of a vertical drilling machine. On top of the pedestal A is mounted a housing $B^1$ for an electric motor and gearing for driving the test spindle B, and above the bracket $A^4$ is mounted a housing $B^2$ for mechanism coupling the driving mechanism to such test spindle. The work-table carries a self-centering device $A^7$ arranged to facilitate accurate location of the workpiece, such for example as a cylinder or annulus, substantially to align the centre or central axis of the surface under test with the axis of the test spindle B. The displacement detector C (see FIGURE 2) carried on the test spindle B comprises a radially adjustable bar $C^1$ carrying a support member carried on a strong ligament hinge $C^2$ lying in a horizontal plane, such support member having a hollow generally vertical part $C^3$ and a generally horizontal arm $C^4$. By means of a button-activated reversible electric motor $C^5$ operating through gearing $C^6$ on a plunger $C^7$ engaging with the arm $C^4$, the member $C^3$, $C^4$ can be closely adjusted, due to pivotal movement of such member at its supporting ligament $C^2$, to suit the radius of the workpiece under test, after coarse radial adjustment of the detector C has been effected by means of the radially adjustable bar $C^1$. Extending upwardly into the hollow part $C^3$ of the support member $C^3$, $C^4$ is a light generally vertical lever $C^8$ pivoted to the member $C^3$, $C^4$ about a horizontal axis by means of a knife edge $C^{14}$, such lever $C^8$ carrying at its lower end a feeler $C^9$ lightly biassed in a radial direction by means of springs $C^{10}$ to contact the test surface at the section thereof to be tested and at its upper end the common armature $C^{11}$ of two variable air gap iron core inductances $C^{12}$, $C^{13}$ operating differentially and of which the coils and stators are mounted oppositely within the hollow part $C^3$ of the support member $C^3$, $C^4$. The differentially operating inductances $C^{12}$ and $C^{13}$ are connected in circuit with a conventional electrical modulating device D (see FIGURE 3) fed with an alternating carrier current the modulations of which are determined by the movements of the armature $C^{11}$ in accordance with the movements of the feeler $C^9$ when the test spindle B is rotated. The output from the modulating device D is fed to an amplifier $D^1$ and thence to a demodulating device $D^2$ to provide a signal output between $D^3$ and $D^4$ in FIGURES 3 and 4 corresponding to the shape of the surface section under test, and it is with the treatment of this signal output that the present invention is primarily concerned.

Such signal output, for the purposes of the present invention may conveniently be regarded as a Fourier series of A.C. components superimposed on a mean D.C. component. The first Fourier A.C. component constitutes an eccentricity term present due to the fact that the centre or central axis of the surface under test is not exactly aligned with the axis of rotation of the detecting device, and such non-alignment factor may also be regarded as contributing towards the mean D.C. component of the signal output.

The demodulated output of the carrier or radio-type amplifier $D^1$ is suitable for direct application to suitable recording means, for example the polar-coordinate recorder having straight radial ordinates described in United States Patent specification No. 2,606,093. Such recorder E (see FIGURE 1) includes a rotating chart $E^1$ driven at the same speed as the first spindle by means of a synchronous motor, and the polar graph is plotted by inkless electrical marking by means of the marker $E^2$. A casing $E^3$ for such recorder E conveniently houses in addition the above-mentioned electrical apparatus consisting of the modulator D, carrier amplifier $D^1$ and demodulator $D^2$, the detecting means C connecting with such apparatus through a multiple cable $E^4$. Further, such casing E conveniently houses also the electrical apparatus now to be described for producing a reference signal from the signal output.

As shown in FIGURE 4, the output of the carrier amplifier is fed to the recorder E through a change-over switch F which in its other position (dotted) disconnects the carrier amplifier $D^2$ from the recorder E and feeds a reference signal to such recorder. The output of the carrier amplifier $D^2$ is also fed to an extracting device G for deriving an A.C. signal extract from the signal output of the carrier amplifier $D^2$ and also to an on-off switch H which in its operative position connects with an integrating device J for the D.C. component of the signal output. The integrating device J is connected to integrating output means K which in turn is connected at its output side to the output lead from the extracting device G, the combined output of the extracting device G and the integrating output means K constituting the reference signal fed to the first change-over switch F.

The extracting device comprises a number of filter circuits for providing the desired A.C. signal extract, and the arrangement of such filter circuits depends on the form of reference curve which it is desired to provide on the chart. Thus, when it is desired to provide a reference circle on the chart, the filter circuits are arranged to extract the first Fourier A.C. component of the signal output of the carrier amplifier. Again, when it is desired to provide a reference ellipse on the chart, the filter circuits are arranged to extract in addition the second Fourier A.C. component of such output. One convenient arrangement of filter circuits for extracting the first or fundamental A.C. component of such output will now be described with reference to FIGURE 5.

Such arrangement comprises a cathode-follower input stage with valve $G^1$ the output of which is fed to three filtering stages $G^2$ each arranged in a generally similar manner so that for convenience the circuit of one only is shown in the drawing. Thus, each such filtering stage comprises an amplifier valve $G^3$ having an anode load constituted by a filter circuit $G^4$ tuned to the frequency of the fundamental component of the signal output of the carrier amplifier, i.e., the frequency of relative rotation of the detecting means and the surface under test. The tuned filter circuit constitutes part of a feed back circuit $G^5$ connecting to the control grid of the amplifier valve $G^3$ through a cathode follower $G^6$ and the output of the tuned filter circuit is fed (from $G^7$) to the control grid of the amplifier valve in the next filtering stage. The tuned filter circuit conveniently consists of a parallel T-filter network of the well known capacitative and resistive kind illustrated. The output of the third filtering stage is fed to an output stage consisting of an untuned amplifier valve $G^8$ and cathode follower $G^9$, such untuned amplifier valve and cathode follower being coupled through a variable resistance $G^{10}$ adjusted so that the amplitude of the extracted fundamental component is exactly the same as that of such component in the whole signal output, the gain of each filtering stage $G^2$ being arranged to be substantially equal to unity. The output amplifier stage incorporates a second variable resistance $G^{11}$ adjusted so that the D.C. level of the extracted fundamental component is zero. It will be appreciated however that the D.C. component of the signal output of the carrier amplifier $D^2$ is essentially suppressed at the above-described filtering stages. Whilst the above-described filtering arrangement has the characteristic of extracting the fundamental component nominally without change of phase thereof, if desired a variable resistance may be provided in one of the tuned filter circuits and adjusted so that the phase of the extracted component is exactly the same at the output stage as at the input stage.

The integrating device is shown in FIGURE 6 and consists of a capacitor $J^1$ earthed at one side and which in the operative position of the on-off switch H (FIGURE 4) is charged through a suitable resistor $J^2$. The relative magntiudes of the capacitor and resistor are proportioned so that the capacitor is charged by the D.C. component of the second output of the carrier amplifier $D^2$ during the period of one relative rotation of the detecting means C and the surface under test through only a small part of its exponential charging characteristic so that at the end of such charging period, the potential difference across the capacitor $J^1$ is equal to only a fraction, say one tenth, of the mean D.C. level of the signal output of the carrier amplifier. Charging of the integrating capacitor $J^1$ is thus effected at a substantially linear rate. The A.C. content of the signal output is fed to earth through the integrating capacitor $J^1$. Shunted across the capacitor $J^1$ is a second on-off switch $J^3$ through which such capacitor can be fully discharged before a charging period. When both such second on-off switch $J^3$ and the first on-off switch H above-mentioned are closed, the output side of the carrier amplifier $D^2$ is connected to earth.

The potential difference across the integrating capacitor $J^1$ is applied to the integrator output means, also shown in FIGURE 6, such means being constituted by a D.C. amplifier having three amplifying stages with valves $J^4$, $J^5$ and $J^6$. The coupling between the second and third stages $J^5$ and $J^6$ incorporates a variable resistance network $J^7$ adjusted so that the overall gain of the D.C. amplifier is exactly equal to the reciprocal of the fraction of the D.C. level of the signal output to which the integrating capacitor $J^1$ is charged during the charging period. Thus, when the capacitor $J^1$ is charged to one tenth of such D.C. level, the overall gain of the D.C. amplifier is adjusted to be equal to ten. The third stage of the D.C. amplifier also constitutes the output stage thereof, and it will be appreciated that from such output stage is delivered a steady D.C. signal having a magnitude exactly equal to the mean D.C. level of the signal output of the carrier amplifier $D^2$.

Conveniently, the whole signal output of the carrier amplifier $D^2$ and the reference signal constituted by the combination of the A.C. signal extract and the steady D.C. signal are fed to the recorder E respectively during consecutive operative revolutions of the test spindle B following one or more preliminary revolutions thereof during which the filtering arrangement constituting the extracting device G is allowed to settle down to a steady state. Following the preliminary revolution or revolutions of the test spindle B, switches for making and breaking circuit connections generally in the above-described manner are conveniently automatically operated to effect the necessary switching operations in appropriate sequence during the next two operative revolutions of the test spindle B. For this purpose such switches are operated by means of a rotatable cam device L (see FIGURES 7 and 8) driven at one half the speed of revolution of the test spindle B, such cam device L being inoperative during the period of the preliminary revolution or revolutions of the test spindle. In the switching arrangement operated by the cam device L, the two on-off switches are replaced by a three position switch M. During the preliminary period, the change-over switch F connects the recorder E to the carrier amplifier $D^2$, but such carrier amplifier $D^2$ is disconnected from the integrating capacitor $J^1$ by the three way switch M in its first position (shown). In this first position of the switch M, the integrating capacitor $J^1$ is earthed and is thus fully discharged. At the beginning of the first operative revolution of the test spindle B, the cam device is brought into operation and the three position switch moves to its second position by energisation of a solenoid $L^1$, thereby breaking the earthing connection to the capacitor $J^1$ and connecting it to the carrier amplifier $D^2$ through the resistance $J^2$, whereby such capacitor $J^1$ starts to charge. The signal output of the carrier amplifier $D^2$ continues to be fed directly to the recorder E through the change-over switch F. At the beginning of the second operative revolution of the test spindle B, the cam device L has rotated through 180 degrees, after which the three way switch M is moved to its third position intermediate of its first and second positions, disconnecting the integrating capacitor $J^1$ from the carrier amplifier $D^2$ but not yet again earthing such capacitor. The cam device L at this time causes the change-over switch F to move to its other position to apply the reference signal to the recorder E. The successive operative revolutions of the continuously rotating test spindle B are conveniently initiated by successive operations of a push button acting in conjunction with a timing switch operative for substantially one revolution of such test spindle. The timing switch (not shown) may conveniently be operated from a timing disc frictionally mounted on the test spindle B or on any other convenient shaft rotating synchronously with such test spindle, such timing disc being held in a starting position by means of a solenoid controlled detent. The cam device L is conveniently similarly mounted on a spindle, which may be the same spindle as that carrying the timing disc, but is preferably constituted by a spindle driven by an auxiliary motor at a rotational speed slightly exceeding that of the test spindle B. Prior to the successive operations of the push button, the cam L is held in its successive positions by the engagement of a detent $L^2$ with notches $L^5$, $L^6$, $L^7$ and $L^8$ on the face of such cam L. The detent $L^2$ is conveniently mounted on a lever member which also serves to operate the switch M. When the push button is depressed the solenoid controlling the timing disc is energised thus permitting such disc to rotate. Simultaneously the writing pen at the recorder E is rendered operative by means of a writing current and this writing current is utilised also to energise the solenoid $L^1$ thereby permitting the cam L to rotate.

The recorder E, receiving through the switch F the whole signal output, now causes the profile graph to be drawn while the integrator $J^1$ charges up. At the end of substantially one revolution the timing disc and the cam L are arrested by their detents, as the solenoid controlling the timing disc and the solenoid controlling the cam L are de-energised. The switch M is thus free to move under the action of a return spring S, but is held in a mid-position by an inner track $L^3$ on the cam L. The apparatus is now ready for production of the reference circle at the recorder E, for which purpose the push button is again depressed to release the timing disc and the cam L for the period of a second revolution. Although the solenoid $L^1$ is again energised movement of the switch M from its mid-position is prevented by the outer track $L^4$ of the cam L. At the end of the second revolution, when the reference curve has been drawn, the solenoid currents are again switched off, and the detent $L^2$ falls into the notch $L^5$ of the cam L ready for the next sequence of operations. Before each profile test is carried out, one or more preliminary revolutions of the test spindle B are effected to allow the filtering arrangement to settle down to a steady state, and conveniently such preliminary period may be utilised for chart loading at the recorder E.

During the first operative revolution of the test spindle B the recorder E causes to be traced on the chart $E^1$ a curve representing the actual shape or profile of the surface section under test, whilst during the following operative revolution of the test spindle, the recorder causes to be superimposed on such profile curve a reference circle from which the deviations of the profile curve can be measured. It will be clear with regard to the reference curve corresponding to the reference signal consisting of the combined A.C. signal extract and the steady D.C. signal that since the phase of the extracted fundamental component is the same as that of such component in the whole signal output of the carrier amplifier, and further since the magnitude of the steady D.C. signal is the same as the mean D.C. level of such signal output and the amplitude of the extracted fundamental component is the same as that of such component in such whole signal output, the reference circle does in fact correspond to the true mean circle, as previously defined, of the polar graph representing the actual shape of the surface. Such reference circle thus constitutes a true datum relatively to which the deviations of the surface section under test can be measured. It should be mentioned however that the radius of the reference circle is not a measure of the mean radius of the surface under test, since for convenience the sizes of the polar graphs plotted on the chart are arranged to be substantially independent of the size of the workpiece, such graph sizes being determined by the equal D.C. components of the whole signal output and the reference signal. This suppression of the actual radius of the workpiece makes it practical to obtain a considerably greater magnification of the actual surface shape of the workpiece. However, since the mean D.C. level of the signal output of the carrier amplifier may be varied to suit the radius at which the polar graph is to be drawn at the recorder, it is desirable for the integrating device to operate according to a linear law, as described above, in order to ensure that in all cases the magnitude of the steady D.C. signal is exactly equal to such mean D.C. level of such signal output.

The apparatus described is especially useful for determining the relative eccentricity of two nominally concentric sections. Thus, having plotted the polar graphs of the nominally concentric surfaces on the same chart, each with its superimposed true mean circle, the eccentricity of one section to the other can at once be determined without ambiguity.

When it is desired to provide on the chart a reference ellipse, the above described filtering arrangement may be modified (see FIGURE 9) by providing, in parallel with the filtering stages G for extracting the fundamental component of the signal, similar stages M for extracting the second Fourier A.C. component of the signal. In this case the parallel T filter networks in the second group of filtering stages are tuned to the frequency of the second A.C. component. The overall phase and amplitude of such second A.C. component is maintained equal at input and at output in the same way as for the fundamental component. The outputs of the two parallel groups of filtering stages G and M are combined before being fed to the recorder E. The reference curve thus formed on the chart in use corresponds to the true mean ellipse of the polar graph representing the actual shape of the surface section under test. In FIGURE 9, reference letters corresponding to those previously used are marked at parts not specifically referred to.

In addition to the recorder above-described, the apparatus may conveniently be provided with meters for indicating the average deviation of the profile curve from the reference curve and for indicating the maximum deviation of such profile curve from its mean line represented by such reference curve. Such meters may conveniently be housed in the casing $E^3$ (FIGURE 1) alongside the recorder E.

As shown in FIGURE 10, for the purpose of indicating the average deviation, during the second operative revolution of the test spindle B, the whole signal output of the carrier amplifier and the reference signal are respectively fed through cathode followers (housed in a single envelope N), and thence, for balancing the equal D.C. components of such output and reference signal respectively, to opposite corners of a bridge rectifier circuit P, between the other corners of which is connected an averaging meter $P^1$. The corresponding A.C. components of the whole signal output and the reference signal being in phase, the reference signal is effectively subtracted from the whole signal output at the bridge rectifier P so that the averaging meter indicates the true average deviation of the profile under test from the mean line of such profile. For the purpose of indicating the maximum crest or maximum trough in the profile with respect to the reference curve, the A.C. contents of the whole signal output and the reference signal are differentially fed through the cathode followers N to a one-way rectifier Q or $Q^1$ and a peaking meter $Q^2$ or $Q^3$. Two such peaking meters $Q^2$ and $Q^3$ associated with rectifying devices Q and $Q^1$ respectively passing current in opposite senses provide a measure of both the maximum crest and the maximum trough. The peaking meter or meters employed may conviently be of the kind shown in FIGURE 11 wherein a pointer R is pushed up to the highest reading received and retained in such position by means of a pawl R¹ cooperating with a rack R². The rack is formed on a pivoted member R³ normally biassed by springs R⁴ to cooperate with the pawl R¹, but being retractable from such pawl by means of a releasing solenoid R⁵ to permit the pointer to return to zero.

It will be appreciated that the above-described arrangement may be modified in various ways within the scope of the invention. For example, the same method of superimposing on the chart of the recorder a curve representing the actual shape of the surface section under test and a reference curve corresponding to the reference signal may be applied to various types of surface testing apparatus other than that described. If desired, the extracting device may be arranged to extract three or more Fourier A.C. components of the signal output of the carrier amplifier for inclusion in the reference signal. Various types of visual indicating means other than that referred to may be employed, such for example as a cathode ray tube having means for photographing the curves superimposed on the screen. Both the arrangement of the extracting device and the arrangement of the integrating device and output means therefor may also be modified in various ways.

What I claim as my invention and desire to secure by Letters Patent is:

1. Apparatus for measuring and indicating the deviations of a surface section with respect to a basic closed curve, comprising a holder for the workpiece, a feeler in engagement with the surface under test, means for mounting the feeler to permit such feeler to be movable in a direction approximately normal to the surface under test, means for relatively rotating the feeler mounting means and the workpiece holder, whereby during such rotational movement the feeler executes working movements approximately normal to the surface section under test in accordance with the shape of such surface section, detecting means capable of translating physical movements into a representative electrical signal, means operatively connecting the detecting means to the feeler, whereby during the relative rotational movement of the feeler and the surface under test the detecting means produces a combined A.C. and D.C. electrical signal output representing the shape of the surface under test, means for amplifying such electrical signal output, an output circuit for the amplifying means, an extracting device in circuit with the output circuit of the amplifying means and for deriving from the amplified signal output an A.C. signal extract excluding the Fourier D.C. component of such signal output and the Fourier A.C. components of such signal output above a chosen harmonic, such A.C. component or components included in such A.C. signal extract having the same amplitude as the corresponding component or components in the amplified signal output, electrical integrating means in circuit with the output circuit of the amplifying means and responsive to the amplified signal output over an integral number of complete relative rotations of the feeler and the surface under test, output means from the integrating means for delivering a steady D.C. signal equal in magnitude to the mean D.C. level of the signal output, an output circuit connecting the output side of the extracting device and the output side of the integrating output means, whereby the A.C. signal extract and the steady D.C. signal are combined to produce a reference signal, visual indicating means, an electrical connection between the output circuit of the amplifying means and the visual indicating means for feeding the amplified signal output of the detecting means to the visual indicating means, and an electrical connection between the output circuit for the reference signal and the visual indicating means for feeding the reference signal to the visual indicating means in predetermined phase relative to the amplified signal output fed thereto, whereby there is produced in superimposition at the indicating means a curve representing the actual shape of the surface section under test and a reference curve from which the deviations of the surface section under test can be measured.

2. Apparatus for measuring and indicating the deviations of a surface section as claimed in claim 1 in which the integrating means includes a capacitance charged at a predetermined rate by the signal output during the period of an integral number of complete relative rotations of the feeler and the surface under test, and the integrating output means comprises means for delivering the steady D.C. output in accordance with the accumulated capacitance charge.

3. Apparatus for measuring and indicating the deviations of a surface section as claimed in claim 2 including electrical resistive means permitting the capacitance to be charged for the charging period over only a relatively small portions of its exponential charging characteristic, whereby such charging is effected at an effectively linear rate.

4. Apparatus for measuring and indicating the deviations of a surface section as claimed in claim 3 in which the resistive means controls charging of the capacitance to provide at the end of the charging period a potential difference at such capacitance equal to a predetermined small fraction of the mean D.C. level of the signal output, the output means for such integrating capacitance including a D.C. amplifier with a gain equal to the reciprocal of such predetermined small fraction.

5. Apparatus for measuring and indicating the deviations of a surface section as claimed in claim 4 in which the extracting device includes at least one extracting circuit acting to transmit substantially only at the frequency of the first A.C. component of the signal output.

6. Apparatus for measuring and indicating the deviations of a surface section as claimed in claim 5 in which the extracting device includes at least one further extracting circuit acting to transmit substantially only at the frequency of the second A.C. component of the signal output.

7. Apparatus for measuring and indicating the deviations of a surface section as claimed in claim 1 in which the extracting device includes at least one extracting circuit acting to transmit substantially only at the frequency of the first A.C. component of the signal output.

8. Apparatus for measuring and indicating the deviations of a surface section as claimed in claim 7 in which the extracting circuit comprises an amplifier stage having a feed-back circuit incorporating a filter tuned to reject the frequency of the first Fourier A.C. component of the signal output.

9. Apparatus for measuring and indicating the deviations of a surface section as claimed in claim 1 in which the extracting device comprises at least one extracting circuit acting to transmit substantially only at the frequency of the first A.C. component of the signal output, and at least one further extracting circuit acting to transmit substantially only at the frequency of the second A.C. component of the signal output.

10. Apparatus for measuring and indicating the deviations of a surface section as claimed in claim 9 in which each extracting circuit comprises an amplifier stage having a feed-back circuit incorporating a filter, the filter of at least one extracting circuit being tuned to reject the frequency of the first Fourier A.C. component of the signal output and the filter of at least one other extracting circuit being tuned to reject the frequency of the second Fourier A.C. component of such signal output.

11. Apparatus for measuring and indicating the deviations of a surface section as claimed in claim 1 in which the extracting device includes an amplifier output stage from which the desired A.C. signal extract is delivered with a mean D.C. level equal to zero.

12. Apparatus for measuring and indicating the deviations of a surface section as claimed in claim 1 in which the extracting device includes means for adjusting the phase of the A.C. signal extract so that the reference signal and the signal output are applied to the indicating means in correct phase relationship to one another.

13. Apparatus for measuring and indicating the deviations of a surface section as claimed in claim 1 in which the extracting device includes at least one amplifier stage provided with means for adjusting the gain thereof so that the A.C. component or components included in the reference signal have the same amplitude as the corresponding component or components in the signal output.

14. Apparatus for measuring and indicating the deviations of a surface section as claimed in claim 1 including electrical resistive means controlling charging of the capacitance to provide at the end of the charging period a potential difference at such capacitance equal to a predetermined small fraction of the mean D.C. level of the signal output, the output means for such integrating capacitance including a D.C. amplifier with a gain equal to the reciprocal of such predetermined small fraction.

15. Apparatus for measuring and indicating the deviations of a surface section as claimed in claim 14 in which the D.C. amplifier includes means for adjusting the gain thereof so that the steady D.C. signal included in the reference signal has a magnitude equal to the mean D.C. level of the signal output.

16. Apparatus for measuring and indicating the deviations of a surface section as claimed in claim 1 including switching means for connecting the signal generating means to the integrating means during the period of one complete relative rotation of the feeler and the surface under test, the integrating means and the extracting device being disconnected from the indicating means during this period, and for connecting the integrating means and the extracting device to the indicating means during the period of a subsequent complete relative rotation of the feeler and the surface under test, the signal generating means being disconnected from the integrating means during this second period.

17. Apparatus for measuring and indicating the deviations of a surface section as claimed in claim 16 in which the switching means also acts, for the period during which the extracting device and the integrating means are disconnected from the indicating means, to connect the signal generating means directly to the indicating means.

18. Apparatus for measuring and indicating the deviations of a surface section as claimed in claim 1 in which the switching means are operated under the control of a rotatable cam device so shaped as to effect the desired switching operations in the appropriate sequence.

19. Apparatus for measuring and indicating the deviations of a surface section as claimed in claim 1 including switching means for connecting the signal generating means to the integrating means during the period of one complete relative rotation of the feeler and the surface under test, the integrating means and the extracting device being disconnected from the indicating means during this period, and for connecting the integrating means and the extracting device to the indicating means during the period of a subsequent complete relative rotation of the feeler and the surface under test, the signal generating means being disconnected from the integrating means during this second period, and a rotatable cam device for operating the switching means, such cam device being shaped to effect the said switching operations in appropriate sequence.

20. Apparatus for measuring and indicating the deviations of a surface section as claimed in claim 19 in which the rotation of the cam device is controlled by means of a member engaging therewith, such control member being released to permit the cam device to initiate the sequence of switching operations only when the operation of the recording means is initiated.

21. Apparatus for measuring and indicating the deviations of a surface section as claimed in claim 1 including means in circuit with the amplifying means output circuit and the output circuit for the reference signal for differentially rectifying A.C. contents of the whole signal output and the reference signal, and an averaging meter electrically connected in circuit with such rectifying means for indicating the output of such rectifying means as a measure of the average deviation of the surface section under test from the reference curve.

22. Apparatus for measuring and indicating the deviations of a surface section as claimed in claim 1 including means in circuit with the amplifying means output circuit and the output circuit for the reference signal for providing half-wave differential rectification of the A.C. contents of the whole signal output and the reference signal and a peaking meter electrically connected in circuit with such half-wave rectification means for indicating the maximum output of such rectifying means as a measure of the maximum deviation of the surface section under test from the reference curve.

References Cited in the file of this patent
FOREIGN PATENTS
822,182    Great Britain  ----------- Oct. 21, 1959